United States Patent
Hartmann et al.

(10) Patent No.: US 10,612,711 B2
(45) Date of Patent: *Apr. 7, 2020

(54) PULSE DAMPENER WITH AUTOMATIC PRESSURE-COMPENSATION

(71) Applicant: IDEX Health & Science LLC, Middleboro, MA (US)

(72) Inventors: Daniel M. Hartmann, Middleboro, MA (US); Efthimios Tsirlis, Middleboro, MA (US)

(73) Assignee: IDEX Health & Science LLC, Middleboro, MA (US)

( * ) Notice: Subject to any disclaimer, the term of this patent is extended or adjusted under 35 U.S.C. 154(b) by 250 days.

This patent is subject to a terminal disclaimer.

(21) Appl. No.: 15/796,233

(22) Filed: Oct. 27, 2017

(65) Prior Publication Data

US 2018/0051840 A1 Feb. 22, 2018

Related U.S. Application Data

(63) Continuation of application No. 14/592,722, filed on Jan. 8, 2015, now Pat. No. 9,829,140.

(51) Int. Cl.
*F16L 55/04* (2006.01)

(52) U.S. Cl.
CPC .......... *F16L 55/041* (2013.01); *F16L 55/043* (2013.01)

(58) Field of Classification Search
CPC ....... F16L 55/041; F16L 55/043; F16L 55/05; F16L 55/052; F16L 55/053
See application file for complete search history.

(56) References Cited

U.S. PATENT DOCUMENTS

| | | | |
|---|---|---|---|
| 2,228,292 A | 6/1941 | Wood | |
| 2,653,552 A | 9/1953 | Geeraert | |
| 3,169,551 A * | 2/1965 | Lewis | F04B 11/0016 138/26 |
| 3,250,224 A | 5/1966 | Phillips et al. | |
| 3,353,560 A * | 11/1967 | McCulloch | F16L 55/052 138/30 |
| 3,368,495 A | 2/1968 | Turner | |
| 3,474,830 A | 10/1969 | Hertell | |
| 3,738,623 A | 6/1973 | Tuckey | |
| 3,741,692 A | 6/1973 | Rupp | |

(Continued)

FOREIGN PATENT DOCUMENTS

| | | |
|---|---|---|
| DE | 2812076 | 10/1979 |
| EP | 2724736 | 4/2014 |

OTHER PUBLICATIONS

PCT/US14/22810 "International Search Report and Written Opinion," dated Jun. 24, 2014.

(Continued)

*Primary Examiner* — Reinaldo Sanchez-Medina
(74) *Attorney, Agent, or Firm* — Vinson & Elkins L.L.P.

(57) ABSTRACT

A fluid pulse dampener with automatic pressure-compensation is provided. A system of chambers and channels in the dampener creates an internal feedback mechanism that increases or decreases a compensating pressure on the membrane in response to increases or decreases in the pressure of a fluid moving past the other side of the membrane. Variations of the pulse dampener allow for the input and/or output of gas flow is be restricted or increased as may be desired.

18 Claims, 6 Drawing Sheets

(56) References Cited

U.S. PATENT DOCUMENTS

| | | | |
|---|---|---|---|
| 3,853,147 | A | 12/1974 | Cibulka |
| 4,312,382 | A | 1/1982 | Gebauer |
| 4,392,791 | A | 7/1983 | Mandroian |
| 4,552,182 | A | 11/1985 | Graham |
| 4,556,087 | A | 12/1985 | Casilli |
| 4,629,562 | A | 12/1986 | Kercher |
| 5,472,600 | A | 12/1995 | Ellefson et al. |
| 5,651,931 | A | 7/1997 | Bailey et al. |
| 5,797,430 | A | 8/1998 | Becke |
| 6,019,135 | A | 2/2000 | Onishi |
| 6,109,304 | A | 8/2000 | Wolf et al. |
| 6,478,052 | B1 | 11/2002 | Conley et al. |
| 7,942,650 | B2 | 5/2011 | Kitahara et al. |
| 9,829,140 | B2 * | 11/2017 | Hartmann ............. F16L 55/041 |
| 2001/0007062 | A1 | 7/2001 | Cumaresq-Lucas et al. |
| 2007/0295663 | A1 | 12/2007 | Iraneta et al. |
| 2008/0210324 | A1 | 9/2008 | Hasunuma |
| 2008/0257835 | A1 | 10/2008 | Benevides et al. |
| 2010/0126921 | A1 | 5/2010 | Rahn et al. |

OTHER PUBLICATIONS

PCT/US2016/012359 "International Search Report and Written Opinion," dated Apr. 4, 2016.

* cited by examiner

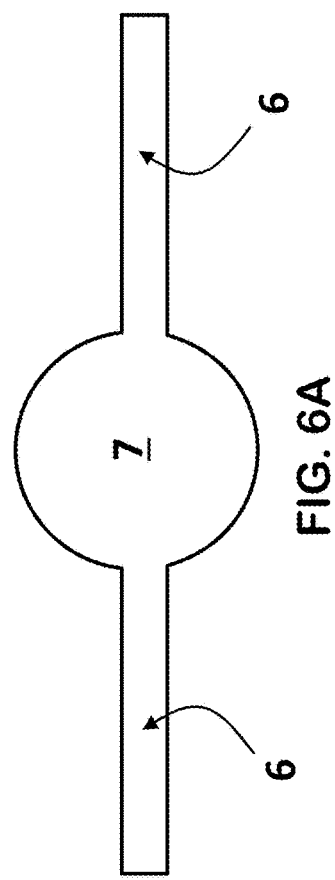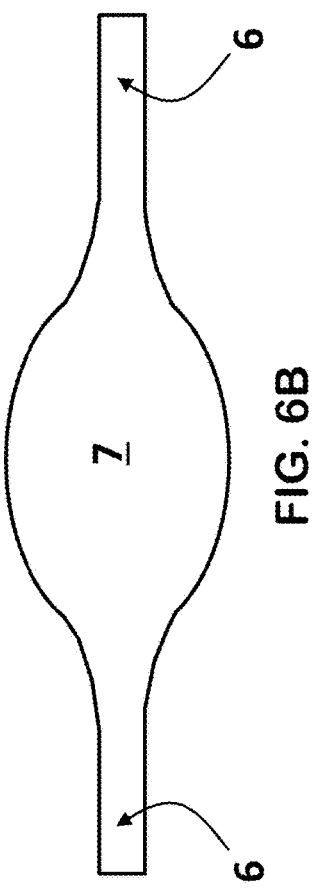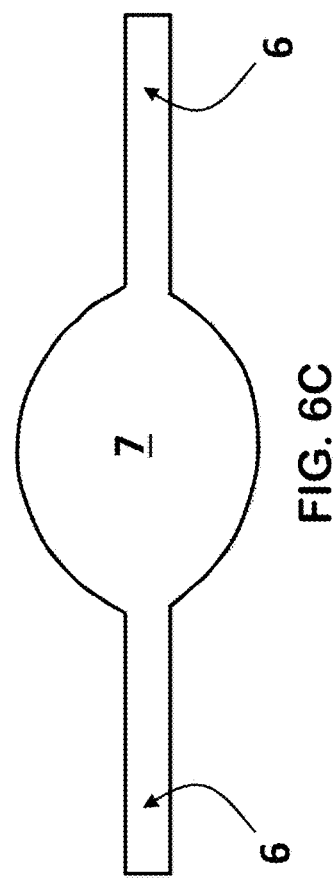

PULSE DAMPENER WITH AUTOMATIC PRESSURE-COMPENSATION

CROSS-REFERENCE TO RELATED APPLICATIONS

This application is a continuation of and claims the benefit of priority of U.S. patent application Ser. No. 14/592,722, filed on Jan. 8, 2015, the entire contents of which are incorporated herein by reference.

FIELD OF THE INVENTION

The present invention relates to pulse dampeners generally, and more particularly to fluid pulse dampeners that can automatically compensate for changes in fluid pressure, and to systems and methods that use the same.

BACKGROUND OF THE INVENTION

It is known that pressure variations or pulses may occur when fluids are pumped through conduits. These pressure variations and the resulting mechanical vibrations can disrupt the constant flow of the fluid and cause damage and wear to the pipes and connections. Moreover, such pressure variations can disrupt or ruin downstream applications, which may depend on smooth, steady flow for their proper function. To address these problems, pulse dampeners have been developed to reduce or eliminate pulsations and vibrations in the fluids as they are pumped through pressurized systems. Conventional pulse dampeners typically comprise a chamber or passage that is connected to the pipe or other conduit through which the pressurized fluid flows, and an internal mechanism for absorbing and "dampening" the pulses. Conventional pulse dampeners often use internal elastic membranes which expand and contract in response to pressure changes in the pressurized fluids and thereby absorb pulses as the fluid passes through the dampener and past the membrane.

One major disadvantage of conventional dampeners that use elastic membranes is that often the dampener's pressure tolerance must be sacrificed for low internal volumes, and vice versa. In order for such a conventional dampener to tolerate high pressures (e.g., pressures at or above 100 psi), the elastic membrane typically must be relatively thick to prevent it from ripping or exploding under the pressure. However, thick membranes are relatively insensitive to pulsations, and thus a thick membrane must have a large surface area in order to be an effective dampener. Larger membrane surface areas unfortunately mean greater internal volumes. Conversely, a thin membrane is very sensitive to pressure fluctuations and thus can be kept small resulting in smaller internal volumes while maintaining good dampening results. However, conventional thin membranes often rip at high pressures, meaning that conventional dampeners with thinner membranes cannot tolerate high pressure fluid systems.

To address these problems, methods of compensating for fluid pressure have been developed. One such method is to use air and air pressure to try to counteract and compensate for the pressure exerted by the pressurized fluid moving through the dampener. Conventional pulse dampeners or surge suppressors that do not use elastic membranes have incorporated air chambers such that the fluid being pumped through the conduit is allowed to compress the air in the air chamber and occupy a greater proportion of the volume of the chamber as the fluid pressure increases. When the fluid pressure decreases, the air in the chamber expands and returns some of the fluid from the chamber to the conduit system.

A problem with the above approach using one or more air chambers that communicate with the fluid channel, however, is that some of the air will likely dissolve into the fluid being pumped, thereby reducing the volume of air in the chamber and potentially affecting the composition of the fluid being pumped. An alternative approach that eliminates this problem is to use a dampening membrane that separates the fluid being pumped through the conduit system from an air chamber used to compensate for the fluid pressure. In such systems, the fluid exerts pressure on the membrane, causing it to expand toward the air pressure chamber, and the air in the chamber pushes back on the membrane to compensate for that pressure and membrane displacement. Conventional pulse dampeners that use this method may use a closed air chamber with a static amount of air. However, without the ability to increase or decrease the amount of air in the air chamber, the pressure and volume of the air cannot be independently controlled. As the fluid pressure increases on one side of the membrane, the air in the air chamber on the other side of the membrane is compressed. The air pressure rises, while the volume occupied by the air is reduced. This results in a corresponding increase in the internal volume that must be filled by the fluid. Even more problematic is the fact that as the air volume is compressed, the pulse dampener becomes less and less effective at absorbing pulses because it takes more and more fluid pressure to compress the remaining air by any given amount.

Feedback mechanisms have been developed for use with such dampeners, allowing air to be dynamically added or removed from the air chamber, in response to changes in the fluid pressure. Such feedback mechanisms enable the pressure in the air-chamber to be adjusted, while maintaining a roughly constant volume of air in the chamber. However, conventional feedback mechanisms have several limitations: They tend to be complex and use elaborate mechanical or electromechanical means, making them difficult and expensive to manufacture and maintain.

U.S. Pat. No. 5,797,430 titled "Adaptive Hydropneumatic Pulsation Dampener," issued to Beckë et al. on Aug. 25, 1998, for example, uses an air or gas chamber to compensate for the displacement of the dampening membrane by the pressurized fluid. The hydropneumatic pulsation dampener disclosed in the Beckë et al. '430 patent, however, uses the pressurized fluid itself to regulate the air pressure in the gas chamber. The system couples the hydraulic system with a gas chamber such that some of the pressurized fluid is directed into the gas chamber and exerts pressure on a membrane that encloses the gas. When the gas membrane is compressed by the fluid, it pushes air against the dampening membrane. A throttle system regulates how much of the fluid is directed to the gas chamber, depending on changes in pressure in the hydraulic system. Thus, higher fluid pressures, and the greater associated displacement of the dampening membrane toward the gas chamber, result in greater amounts of fluid around the gas chamber membrane, which in turn causes more air pressure to be exerted on the dampening membrane against that of the fluid. Unfortunately, the use of the hydraulic fluid itself to regulate the air pressure in this mechanism creates a huge internal volume because large amounts of the fluid are directed into the gas chamber and out of the hydraulic system.

U.S. Pat. No. 3,741,692, titled "Surge Suppressor for Fluid Lines" and issued to Rupp on Jun. 26, 1973, discloses a surge suppressor that uses as air chamber for autocompensation and incorporates an inlet/outlet valve system to adjust the air pressure in the air chamber in response to changes in the fluid pressure while maintaining the volume of air in the air chamber. This system uses an axial rod and plungers to open the different valves at the appropriate times, and has a very large air chamber.

Similarly, U.S. Pat. No. 4,556,087, titled "Pulsation Dampener" and issued to Casilli on Dec. 3, 1985, involves a complex mechanical system for independently regulating the pressure and volume of air in the chamber, including a large air chamber, an axial rod connection, and an on/off valve. These types of systems are intended to accommodate extremely large fluid volumes and pressures and are not ideal for a dampener intended to work effectively with relatively small amounts of fluid. They are also mechanically complex and expensive to manufacture.

Another example of a pulse dampener is that disclosed in U.S. Pat. No. 4,629,562, titled "Pulse Dampener" and issued to Kercher on Dec. 16, 1986. The Kercher patent explains that a pulse dampener may be used in a liquid chromatography system and teaches the use of a chemically inert diaphragm and a unitized plug that has two portions, each of which has different compressibility characteristics. However, no pressure feedback or compensation is provided for dampening pulses.

Yet another example of a pulse dampener is that shown in U.S. Pat. No. 4,552,182, titled "Hydraulic Pulse Dampener Employing Two Stiff Diaphragms and Nesting Members," issued to Graham on Nov. 12, 1985. The Graham patent discloses the use of two diaphragms, each positioned opposite a recess formed in the pulse dampener housing. The two diaphragms are designed so that each will flex under different pressure ranges. However, no pressure feedback or compensation is provided for dampening pulses.

The foregoing U.S. Pat. Nos. 5,797,430, 3,741,692, 4,556,087, 4,629,562, and 4,552,182 are hereby incorporated by reference as if fully set forth herein.

SUMMARY OF THE INVENTION

The present disclosure provides a membrane-based pulse dampener that uses air pressure to compensate for the pressure variations of a fluid moving through the pulse dampener, and methods for using the same. Generally, the dampener in an embodiment as disclosed herein uses a simple, inexpensive feedback mechanism to increase or decrease the amount of a gas (such as air) in a chamber in response to changes in fluid pressure. By dynamically changing the amount of the gas in the chamber, the pressure can be changed to compensate for fluid pressure variations, while maintaining a constant, or near-constant chamber volume. The features of the present disclosure make it an effective pulse dampener for pressurized fluid systems across a large range of pressures, and therefore useful in a wide variety of applications. In addition, the present disclosure provides a system that has a small footprint, and a very small internal volume, enabling it to be used in systems where both size and the amount of internal volume must be minimized. The present disclosure provides for a pulse dampener having a main body through which a fluid flows and a pneumatic cover that is attached to the main body and provides the air pressure compensation mechanism. As with conventional membrane-based dampeners, the main body of the dampener may comprise a fluid input port and a fluid output port that can be attached and secured to other components of a system, such as a pump connected to the fluid input port, and a central channel through the dampener that connects the input port to the output port so that a fluid can pass through the dampener. There can be a plurality of gaps or openings in the channel, which are covered by at least one elastic membrane. The membrane can be made of a desired material and have a desired thickness. The membrane may be comprised, for example, of natural rubber, silicone rubber or Santoprene. In harsher chemical environments (such as those in which the fluid is a corrosive chemical), EPDM, Viton, Kalrez, and Pharmed might be appropriate materials. The membrane functions to absorb and dampen the pulses in the fluid flowing through the dampener. On the other side of the membrane, sandwiching the membrane with the main body of the dampener, can be a pneumatic cover.

The pneumatic cover can be used to provide an air pressure compensation feature. In one embodiment, there are two open-ended chambers defined by the pneumatic cover that is adjacent to the membrane, such that the membrane covers or encloses the two chambers when the entire pulse dampener is assembled. These chambers can be located at the same positions on the membrane that the gaps or openings in the fluid channel are located. In other words, the membrane can be exposed and deflected into the fluid channel or the chambers in the same locations. The enclosed chamber that is closest to the input port of the main body can serve as a dampening chamber.

The dampening chamber in some embodiments may contain within it a membrane stop. In such an embodiment, when the pressurized fluid flows into the fluid input port and across the outside of the dampening chamber, the membrane expands into the dampening chamber and dampens the fluid pulses. The membrane stop can prevent the membrane from expanding past a certain point. In such an embodiment, the membrane stop may have at least one small hole, and can have a plurality of small holes, in it that allow air to pass through it unimpeded.

In certain embodiments, on the other side of the fluid channel and located between the dampening chamber and the fluid output port is another chamber, which can be referred to as an air pressure buffer chamber. In such an embodiment, this buffer chamber is in fluid communication with the dampening chamber via a small channel. In certain embodiments, the air pressure buffer chamber has on the side opposite from the dampening chamber an air input port, which opens and exposes the air pressure buffer chamber to the atmosphere. A pressurized air source may be connected to the pneumatic cover at the air input port, which can provide a source of the air pressure used to compensate for the fluid pressure.

In this particular embodiment, the other chamber in the pneumatic cover that is adjacent to the membrane is the variable-restrictive element ("VRE") chamber. This VRE chamber is located between the fluid output port in the main body and the dampening chamber, and it is connected to two channels within the pneumatic cover: a channel that connects it to the air pressure buffer chamber, and a channel that connects it to an air output port in the pneumatic cover. The air output port opens up to the atmosphere at the surface of the pneumatic cover in this particular embodiment.

In one embodiment, when a pressurized fluid passes through the main body of the dampener, it first pushes against the portion of the membrane above the dampening chamber, causing the membrane to deflect or expand into the dampening chamber toward the membrane stop. As the fluid passes across the portion of the membrane located above the VRE chamber, it causes that portion of the membrane to deflect or expand into the VRE chamber. The part of the membrane that expands into the VRE chamber may eventually, depending on several variables, expand far enough so as to obstruct the two channels or passages that connect the VRE chamber to the air pressure buffer chamber and air output port. When this obstruction occurs, wholly or partially, pressurized air being pumped into the air pressure buffer chamber through the air input port begins to build in the air pressure buffer chamber because it can no longer pass through the channels to the VRE chamber and then out of the dampener via the air output port. This increasing air pressure pushes back against the membrane deflected info the dampening chamber, pushing or deflecting it in the opposing direction of the fluid pressure's displacement and pushing the membrane back towards its equilibrium or neutral position, and away from the membrane stop. The increase in air pressure also causes an increase in pressure on the membrane that is wholly or partially occluding the channel that connects the VRE chamber to the air pressure buffer chamber, causing the membrane deflected into the VRE chamber to be pushed or deflected towards its equilibrium position as well. Essentially, the more the fluid pressure builds up in the main body of the dampener as the fluid passes through the fluid channel, the more the membrane covering the VRE chamber occludes the air flow lutes and out of the VRE chamber, and the higher the compensating air pressure in the air pressure buffer chamber becomes.

In certain embodiments, features of the present disclosure can be modified or features added to achieve desired results and optimize the effectiveness of the dampener. For example, in one particular embodiment, two separate membranes can be used—one above the dampening chamber, and a separate one above the VRE chamber. This approach allows each membrane to be optimized to achieve distinct or unique purposes. For example, different materials can be used for the two membranes or one membrane can be thinner while the other thicker and more resistant to small changes in fluid pressure. Similarly, the main body and pneumatic cover of the pulse dampener can be made of different materials if desired. In addition, the materials of which the main body and pneumatic cover are made can be selected based on the intended application of the pulse dampener. For example, for a pulse dampener intended for use is high pressure applications using acidic or corrosive chemicals in the fluid, a stainless steel body and cover may be desired, whereas a less expensive material such as acrylic could be used in other applications. In another embodiment, the pulse dampener may comprise a single, unitary body piece instead of having a body and pneumatic cover attached to one another.

In some alternative embodiments, the membrane or membranes can be sandwiched between the main body of the dampener and the pneumatic cover. However, this sandwiching can lead to the wrinkling of the membranes or cause other deformities in the membranes which lessen their effectiveness. Thus, in other alternative embodiments, the membranes may be stretched over concentric rings, causing them to form seals over the dampening and VRE chambers. This can be achieved by having a series of three concentric rings wherein the membrane is placed over the middle ring and pushed down on either side of that ring by an outer and an inner ring. The outer ring holds the membrane in place over the middle ring, and the pushing down of the inner ring on the membrane over the dampening or VRE chamber causes it to form a seal over that chamber. The rings can either be integrated into the main body and pneumatic cover themselves, or be included as a separate piece of the fully assembled dampener.

In certain embodiments, restrictive elements can be provided and attached to the air input port and/or the air output port to optimize air flow and control the air pressure in the chambers. Adding one or more restrictive elements to the air input port can limit the input flow rate of air, thereby preventing pressure from building up in the air pressure buffer chamber too rapidly when the VRE chamber begins to occlude. Providing one or more restrictive elements attached to the air output port can limit both input and output air flow and can help prevent sudden de-pressurization of the air pressure buffer chamber, which may occur if the pressure in the liquid channel decreases too rapidly. The addition of one or more restrictive elements to the air output port, however, may raise the zero-liquid-flow pressure in the air pressure buffer chamber. This, in turn, can push the membrane in the dampening chamber towards the fluid channel, making the system less effective.

BRIEF DESCRIPTION OF THE DRAWINGS

FIGS. 6A, 6B, and 6C are top views of alternative shapes of chambers which can be used in a pulse dampener in accordance with the present disclosure.

DETAILED DESCRIPTION

Figure 1:
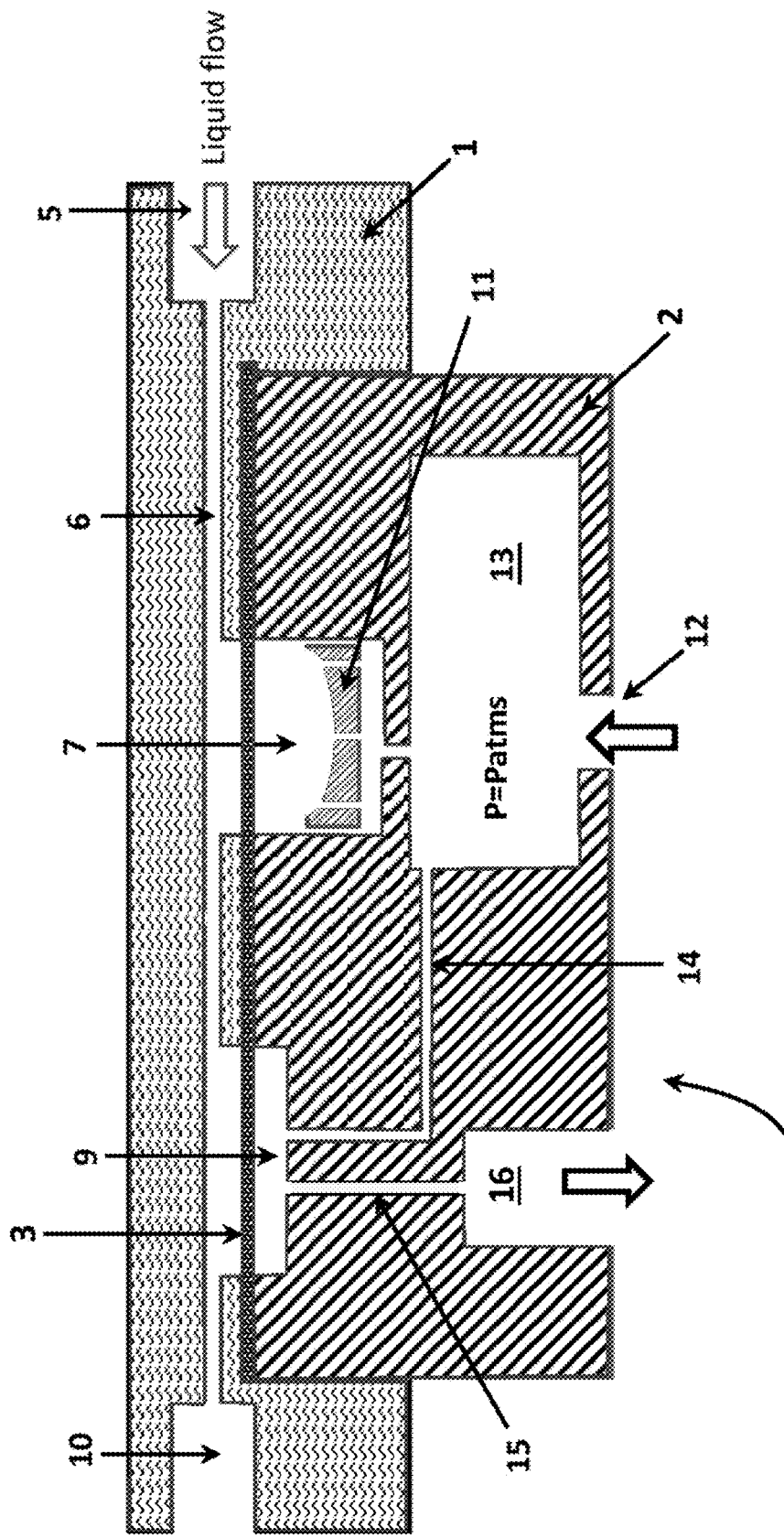
FIG. 1 is a cross-section view of a pulse dampener in accordance with the present disclosure.

An example of a fluid pulse dampener 25 in accordance with the present disclosure and having an integrated air pressure compensation mechanism is shown in FIG. 1. The dampener 25 comprises two primary components: a main body 1 and a pneumatic cover 2. The main body 1 has an input port 5, output port 10, and fluid channel 6. When the dampener 25 is attached to a pressurized conduit system (not shown), fluid enters the dampener 25 at input port 5, flows through fluid channel 6, and eventually exits the main body of the dampener at an output port 10. The fluid is usually a liquid, but can also be a mixture of liquid and one or more gases, or can consist of a gas. Those skilled in the art will appreciate that the fluid can be of almost any type of liquid or gas. An elastic dampening membrane 3 is located between the main body 1 and the pneumatic cover 2. On a first side adjacent to the pneumatic cover 2, the elastic membrane encloses two open spaces or chambers defined by the pneumatic cover 2; a dampening chamber 7 and a variable-restrictive element ("VRE") chamber 9. The side of the elastic membrane that is adjacent to the main body 1 is exposed to the fluid channel 6 such that fluid passing through the channel 6 comes into contact with the elastic membrane 3 at the two locations that are directly above the dampening chamber 7 and VRE chamber 9. Thus, the membrane 3 separates the fluid in the channel 6 from the dampening chamber 7 and from the VRE chamber 9.

As shown in FIG. 1, the dampening chamber 7 is connected via a small channel to an air pressure buffer chamber 13. The dampening chamber 7 is in fluid communication with the buffer chamber 13 via this channel. There is a membrane stop 11 located within the dampening chamber 7. The air pressure buffer chamber 13, in turn, has an air input port 12, which can be connected to a pressurized air source. When air enters the air pressure buffer chamber 13 through the air input port 12, it passes through an air passage 14 into the VRE chamber 9. The air then flows from the VRE chamber 9 through another air passage 15, through an air output port 16, and out of the dampener 25. Those skilled in the art that the references to "air" herein reflect the situation in which pulse dampener 25 is open to the local atmosphere (which may be air, or in some applications may be a mix of gases that differs from the mix of gases in the atmosphere), or where pressurized air is used. However, although "air" is used herein for convenience, those skilled in the art will appreciate that other gasses or gas compositions may be used and, in some applications, a liquid may be used.

The dampener 25 as shown in FIG. 1 can be said to be in a resting, neutral or equilibrium state. This is because the membrane 3 is not being pushed into, or deflecting into or away from, or being pushed or deflected out of or away from, either dampening chamber 7 or the VRE chamber 9. The main body 1, as well as pneumatic cover 2 of the dampener 25 can be made of just about any rigid material or materials, including for example plastics, metals, ceramics, and so forth, including combinations of these types of materials. Lower cost materials are helpful in order to keep expenses and costs down, especially when those materials work well with the intended chemical environment for a given application of the dampener 25. For aqueous solutions, for example, acrylic could be a good material for the body 1. For harsher chemical environments, high-performance thermoplastics such as cyclic-olefin polymers and co-polymers, polysulfone, polyphenylsulfone, PEEK, and PTFE are examples of materials that may be used for the body 1. For certain high pressure applications, materials such as ceramics and stainless steel or other stiff metals may be most useful for the body 1. In one particular embodiment, the main body 1 and the pneumatic cover 25 can be manufactured by the use of additive manufacturing techniques. Stereolithography, for example is an additive manufacturing technique in which a solid object is made by successively printing thin layers of one or more materials on top of one another in a selected pattern. It will be appreciated that body 1 and cover 2 may be a unitary piece, or (as shown) may be separate from one another. In addition, different materials may be used for the body 1 and the cover 2 if desired.

Figure 2:
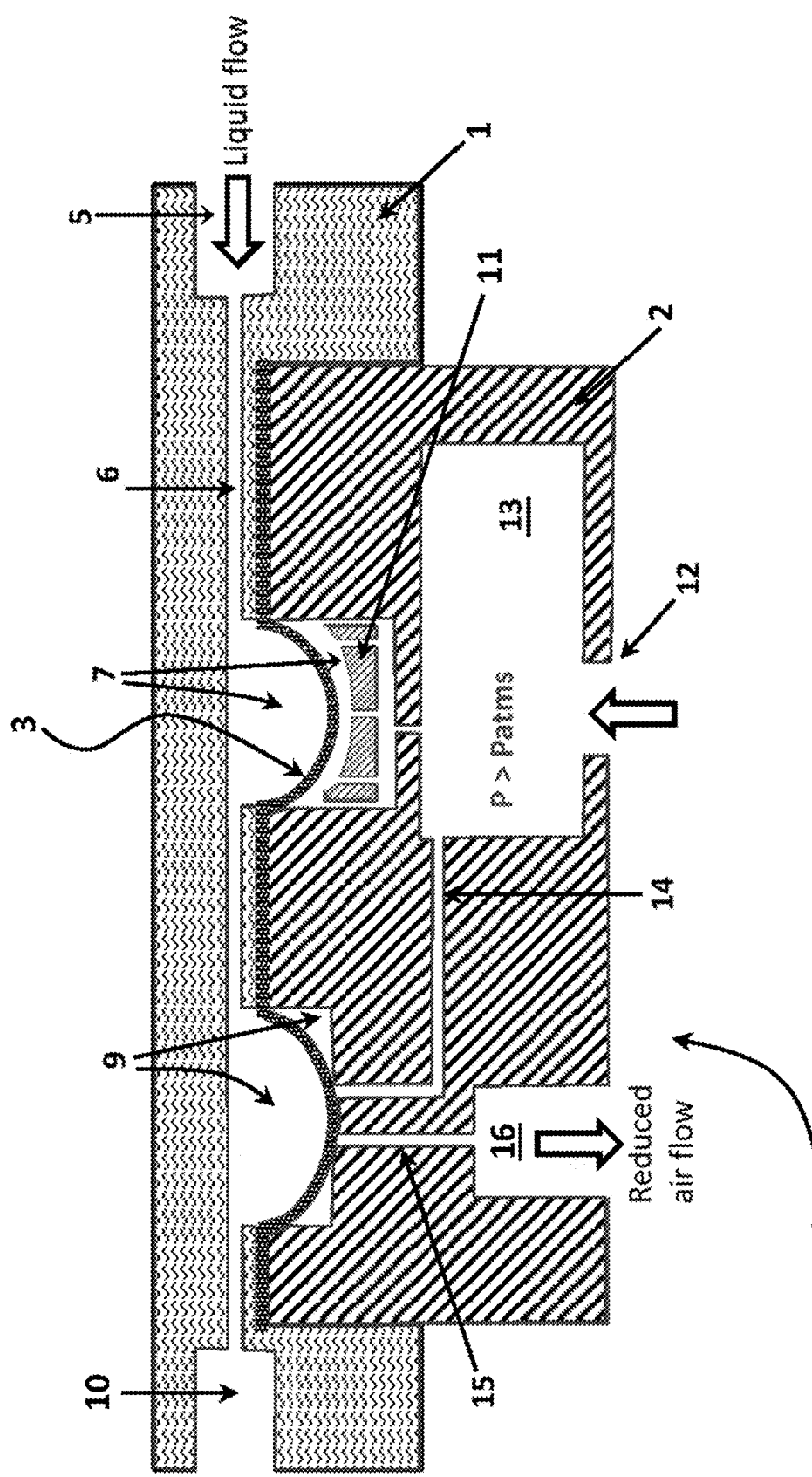
FIG. 2 is a cross-section view of a pulse dampener in accordance with the present disclosure.

The pulse dampener 25 of FIG. 1 is shown in an active (or deflected) state in FIG. 2. (Generally, like elements in the Figures retain the same numbers throughout this disclosure for more convenient reference.) As fluid enters the main body 1 of the dampener 25 and passes through the fluid channel 6, the pressure in the fluid channel 6 increases, causing the elastic membrane 3 to expand into the damping chamber 7 toward the membrane stop 11. The pressurized fluid then passes across the portion of the membrane 3 located above the VRE chamber 9, causing that portion of the membrane 3 to expand into the VRE chamber 9. As the membrane 3 expands into the VRE chamber 9, the membrane 3 partially occludes the air flow into and out of the VRE chamber 9 by wholly or partially obstructing air passages 14 and 15, such as shown in FIG. 2. The degree of obstruction of the passages 14 and 15 by the membrane 3 can depend on several factors, including the size and depth of the VRE chamber 9, the surface roughness of the VRE chamber 9 at the location of air passages 14 and 15, and the surface roughness and stiffness of the membrane 3. As the VRE chamber 9 is occluded, the air pressure builds up in the air pressure buffer chamber 13 and air then flows into the dampening chamber 7, pushing back against the membrane 3 in the dampening chamber 7. In so doing, the air pressure pushes the membrane 3 that has expanded into the dampening chamber 7 back towards its equilibrium position (shown in FIG. 1) and away from membrane stop 11. The air pressure also pushes back on the membrane 3 in the VRE chamber 9 after passing through air passage 14 until an equilibrium air flow is established. The greater the pressure of the fluid passing through the fluid channel 6, the more the membrane 3 in the VRE chamber 9 occludes the flow paths 14 and 15, and the higher the compensating air pressure in the air buffer chamber 13 becomes.

In one embodiment, the depth of the VRE chamber 9 (and therefore its volume) is kept small so that minimal fluid pressure in the fluid channel 6 will cause occlusion of air passages 14 and 15, and thus air pressure compensation will begin at lower fluid pressures. In this or an alternative embodiment, restrictive elements (not shown in FIG. 2) can also be placed in the air input port 12 and/or air output port 16 to optimize the air flow. Adding a restriction element to the input port 12 limits the input flow rate of air, preventing pressure from building up in the air pressure buffer chamber 13 too rapidly when the membrane 3 moves info the VRE chamber 9 and the VRE chamber 9 begins to occlude. Adding a restrictive element to the output port 16 limits both input and output air flow and can help prevent sudden de-pressurization of the air pressure buffer chamber 13 that may occur if the pressure in the fluid channel 6 decreases too rapidly.

Figure 3:
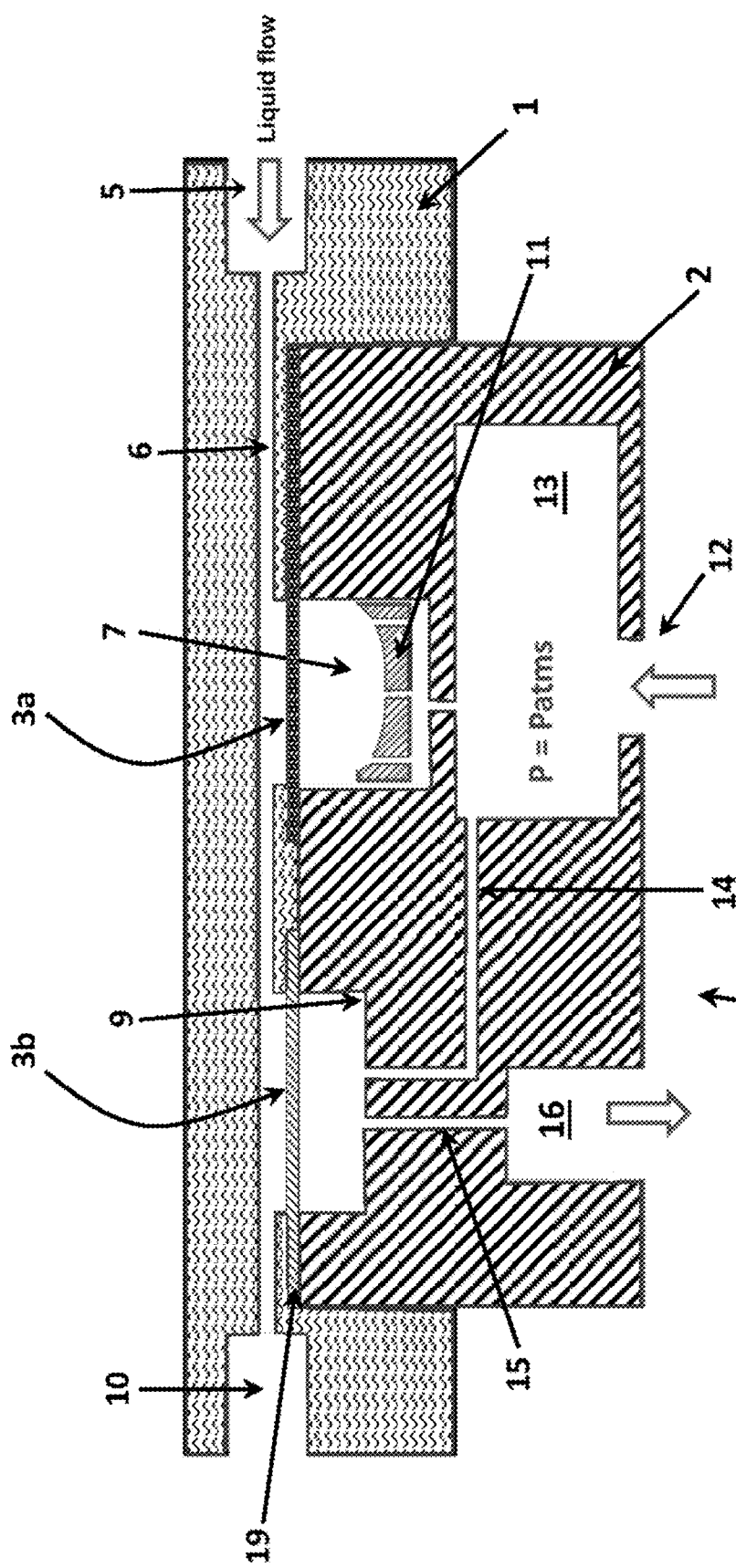
FIG. 3 is a cross-section view of a pulse dampener in accordance with the present disclosure comprising two separate membranes.

In certain embodiments, instead of a single membrane 3 (as shown in FIGS. 1 and 2) a separate dampening membrane 3a and a VRE chamber membrane 3b can be used. Using separate membranes allows for the selection of each with properties that can be tailored to make them appropriate for their unique and distinct functions. Such an embodiment of a pulse dampener 30 with separate membranes 3a and 3b is shown in FIG. 3. The pneumatic cover 2 can be identical to that in FIGS. 1 and 2 except that there are two distinct membranes: a dampening membrane 3a and a VRE membrane 3b. In this embodiment, for example, the dampening membrane 3a may be manufactured to be very flexible so that it responds to small pressure pulses and has good dampening power, whereas the VRE membrane 3b may be stiffer so that it reacts quickly to changes in pressure in the fluid channel 6 and air buffer chamber 13.

One example of a useful dampening membrane is a 0.020 inches thick silicone membrane with a Shore 35 A durometer measurement. If a stiffer VRE membrane is desirable, however, such as in situations where a quick reaction to pressure changes is desired, a suitable membrane could be a 0.0625 inches thick Santoprene membrane with a Shore 50 A durometer measurement. Those skilled in the art will appreciate that other materials and other durometer measurement values may be desired, such as for different applications. For example, in harsher chemical environments (e.g., the fluid in channel 6 consists of a corrosive chemical, acid, or the like), EPDM, Viton, Kalrez, and Pharmed may be better-suited materials than either silicone or Santoprene for the membranes 3a and 3b.

Figure 4:
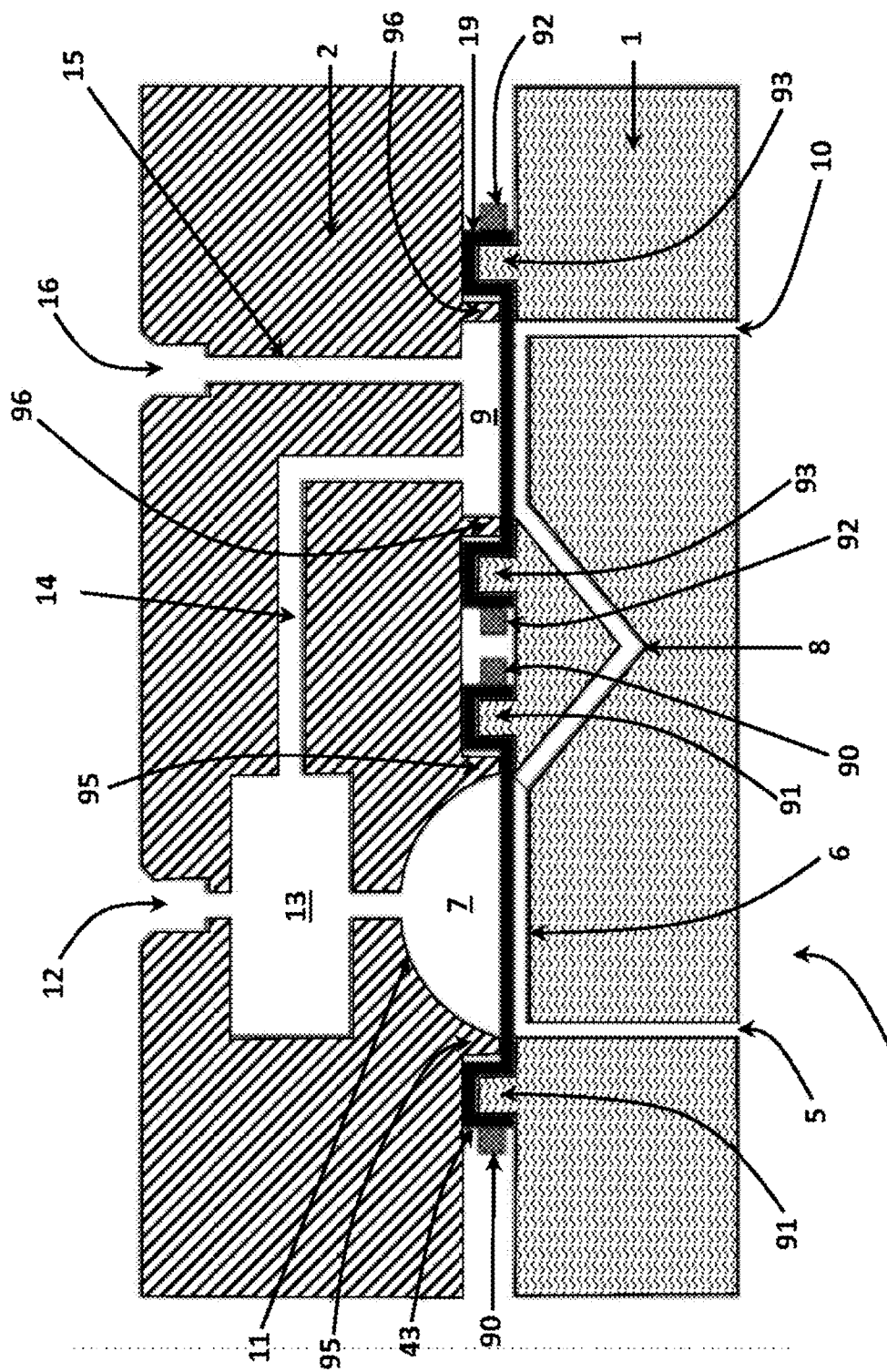
FIG. 4 is a cross-section view of a poise dampener in accordance with the present disclosure which comprises concentric rings.

While some embodiments of the present invention may have the single membrane 3 or two separate membranes 3a and 3b sandwiched between the flat portions of the main body 1 and pneumatic cover 2, other embodiments may use stretched membranes to prevent the membranes from developing wrinkles or other deformities that may affect performance. For example, stretched membranes can be achieved through the use of concentric rings in certain embodiments. A pulse dampener 35 that incorporates concentric rings for stretching the dampening and VRE membranes 43 and 19, respectively, is shown in FIG. 4. As shown in FIG. 4, the main body 1 of the pulse dampener 35 has two pairs of ring protrusions 91 and 93. Rather than having a flat surface adjacent to the main body 1, the pneumatic cover 2 also has protrusions 95 and 96 in the form of a raised dampening chamber ring 95 surrounding one end of the dampening chamber and a raised VRE chamber ring 96 surrounding one end of the VRE chamber 9. The ring protrusions 91 and 93 on the main body are larger in diameter but concentric with the dampening chamber ring 95 and VRE chamber ring 96, respectively, and adapted such that when the main body 1 and pneumatic cover 2 are tightly fitted together in the assembly of the pulse dampener 35, middle ring 91 fits around dampening chamber ring 95 and middle ring 93 fits around VRE chamber ring 96 as shown in FIG. 4. During assembly of the dampener 35, the dampening membrane 43 and VRE membrane 19 are laid across the middle rings 91 and 93, respectively. Then, two outer rings 90 and 92, which are slightly larger in diameter but concentric with the middle rings 91 and 93, respectively, are placed on top of the membranes 43 and 19, respectively, thereby capturing the membrane 43 between outer ring 90 and middle ring 95, and capturing membrane 19 between the outer rings 92 and middle ring 93. The pneumatic cover 2 is then put into place such that the dampening chamber ring 95 pushes the dampening membrane 43 down flat and forms a seal around the dampening chamber and the VRE chamber ring 96 pushes the VRE membrane 19 down flat and forms a seal around the VRE chamber 9. In one particular embodiment, the concentric ring pairs 91 and 95 and 93 and 96, respectively, are integral with the main body 1 and pneumatic cover 2, respectively, as shown in FIG. 4 and described above. However, concentric ring pairs 91 and 95 and 93 and 96, respectively, may also be used in a single membrane embodiment. In such an embodiment (not shown), there would be a single set of three concentric rings surrounding both the dampening chamber and VRE chamber. Moreover, separate concentric rings that are not integrated into the main body and pneumatic cover of the dampener can be used to stretch the membrane or membranes used in alternative embodiments if desired.

Still referring to FIG. 4, the pulse dampener 35 includes an intermediate or middle passage 8 as a portion of the passageway 6. As shown in FIG. 4, the middle passage 8 extends away from the pneumatic cover 2 and towards the exterior of the main body 1. Those skilled in the art will appreciate that the use of the middle passage 8 may allow for easier manufacturing of the main body 1, and can also be used to advantage by adapting the length, size, and shape of the middle passage 8 as may be desired, such as to maintain a certain volume for the fluid between the chambers 9 and 7, to mix the fluid, and the like.

Figure 5:
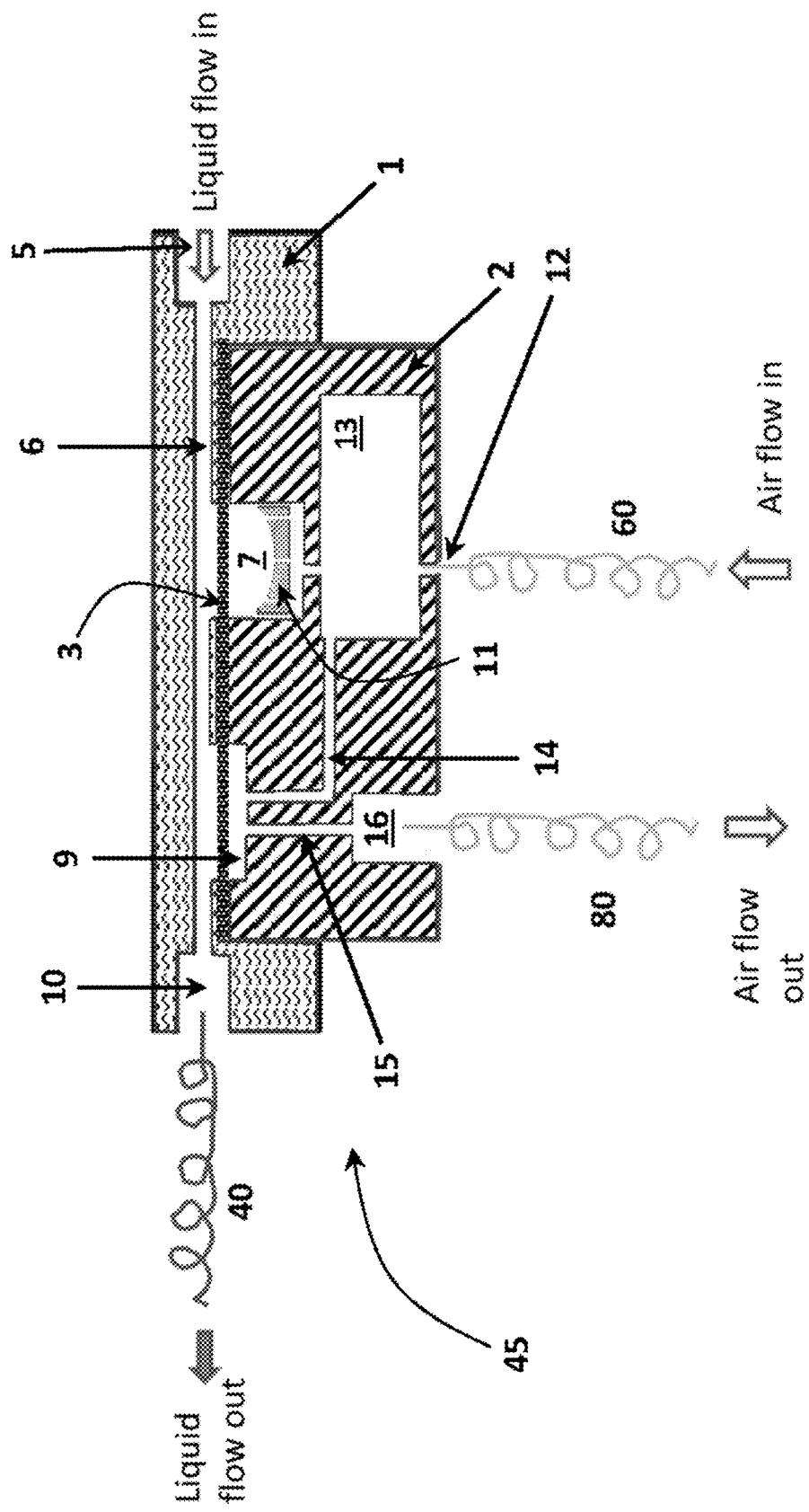
FIG. 5 is a cross-section view of a pulse dampener in accordance with the present disclosure comprising restrictive elements.

Referring now to FIG. 5, a cross-sectional view of another embodiment of a pulse dampener 45 in accordance with the present disclosure is provided. Like features and components in FIG. 5 have the same numbers as indicated in the other illustrations. Pulse dampener 45 may be like the pulse dampener 25 shown in FIG. 1, except that pulse dampener 45 has restrictive elements 60 and 80 which are connected to the air input port 12 and the air output port respectively. (Although not shown in FIG. 5, the pulse dampener 45 could also have just one of restrictive elements 60 and 80 if so desired.) The restrictive element 60 limits the flow of air into the air buffer chamber 13. This helps prevent pressure from building up too rapidly when the VRE chamber 9 begins to occlude from movement of the membrane 3. The restrictive element 80 helps limit both the inflow and outflow of air and helps prevent the sudden depressurization of the air buffer chamber 13 that may occur if the pressure in the fluid channel 6 drops too quickly. Those skilled in the art will appreciate, however, that adding restrictive element 80 can also raise the zero-liquid-flow pressure in the air buffer chamber 13 which, in turn, has the potential effect of pushing membrane 3 in the dampening chamber 7 towards the fluid channel 6. When this happens, the pulse dampener 45 is likely to be less effective at dampening pulses in the fluid flowing through fluid channel 6. It is therefore usually preferred to operate the pulse dampener 45 with restrictive element 60, but not with restrictive element 80.

FIG. 5 also shows restrictive element 40, connected to fluid output port 10. This restrictive element 40 may be used to limit the flow of fluid through the passage, 6, thereby generating additional pressure within the fluid channel 6, in response to fluid flow than would be otherwise generated. This is especially useful if the pulse dampener 45 is connected to a system that has low internal resistance to low.

As shown in FIG. 5, restrictive elements 40, 60 and 80 are all provided by coiled tubing, which can be flexible and of an inner-diameter selected to provide greater or lesser restriction of air flow as may be desired for a given application of dampener 45. It will be appreciated that any restrictive elements 40, 60 and 80 could be provided by tubing or capillaries, by an orifice, or by any other means of restricting the flow of fluid in a way that causes the pressure in the dampener 45 to rise when the flow rate in the dampener 45 rises. In one particular embodiment, the restrictive elements 40, 60 and 80 can be PEEK or FEP tubing having an outer-diameter of 1/32" or 1/16", and having an inner-diameter of between 0.004 thousandths of an inch and 0.020 thousandths of an inch. Of course the tubing, capillaries, or orifice could also be made of other materials, like stainless steel, glass, or aluminum.

Those skilled in the art will appreciate that the pulse dampeners shown and described herein may vary in size and shape as may be desired for various applications. For example, those skilled in the art will appreciate that pulse dampeners 25, 30, 35, and 45 (as shown in FIGS. 1-5) can be used in a variety of different applications and under a variety of different conditions. Pulse dampeners 25, 30, 35, and 45 can be used in systems with a fluid pressure of anywhere between 0 to at least 100 psi or so, and/or in systems with a fluid flow rate through the pulse dampener of anywhere from 0 to 1000 microliters or so per minute. Such pulse dampeners can also be used in systems with much higher fluid pressures, including those with pressures from 100 psi to 10,000 psi or so. In addition, pulse dampeners in accordance with this disclosure typically can be used in systems in which the pulse size of the fluid is anywhere from 0 to 50 microliters or so. In one particular embodiment, the pulse dampener of the present disclosure may include a volume of anywhere between 100 or so microliters to 1000 or so microliters for the fluid (depending to some extent on the size of the dampener and also whether or not the membrane in contact with the fluid is stretched (and in an active state) or at a neutral position not deflecting towards or away from the dampening chamber (and in a resting state). Of course, those skilled in the art will also appreciate that, depending on the selection of materials, and the size and shape of the pulse dampener and its features as shown and described in this disclosure, pulse dampeners in accordance with the present disclosure can find successful application in situations involving even higher pressures, flow rates, and pulse sizes than those noted above.

The size and shape of the dampening chamber of my pulse dampener in accordance with the embodiments of the present disclosure (as well as the VRE chamber and the fluid channel) can be selected and adapted for the pulses that it is intended to dampen in a particular application. In general, to minimize the fluid volume respired in the dampener, the chamber should be kept small while still achieving the desired degree of dampening. This often can be achieved by using a thin, flexible membrane that is highly responsive to pressure pulses. In addition, the volume of the air pressure buffer chamber and the air flow rate at the input port can be selected for a given application. The size and shape of the VRE chamber, may also be tailored to make the pulse dampener more or less responsive to small changes in pressure and/or pulse. The depth of the VRE chamber, for example, can affect how much pressure is needed to initiate the air pressure compensation mechanism. If the VRE chamber is very shallow, then small amounts of pressure and the corresponding slight expansion of the membrane into the VRE chamber can result in the air channels being occluded, whereas a deeper VRE chamber typically will require greater displacement of the membrane (all other things being equal) to obstruct the air flow and initiate the air pressure compensation. Similarly, the composition of the membrane can affect how much pressure is needed for the membrane to occlude the air pathways into and out of the VRE chamber.

While the pulse dampener in one embodiment may be used with an external source of air pressure, there is nothing to prevent such a dampener from being used as a conventional pulse dampener if a pressurized air source is unavailable. The membrane stop can prevent the membrane from expanding until it bursts if no compensating air pressure is applied through the air input port. When used with no source of pressurized air, for example, the air output port may be optionally plugged with a plug adapted to the size and shape of the air output port, and the air input port may be optionally used as a weep hole to convey liquids away from the device with a tube in the event of unexpected fluidic leaks.

In another embodiment, a method is provided in which a pulse dampener in accordance with the figures and the foregoing disclosure is used. In such a method, the steps can include the following: a pulse dampener in accordance with the disclosure is provided, a first end of a first tube or other fluid conduit is connected to a fluid input port of the dampener, with the other end of the tube connected to a pumping system, and a first end of a second tube or other fluid conduit is connected to a fluid output port of the dampener, a first end of a third tube or other fluid conduit is connected to an air inlet port of the dampener, having the other end of the third tube connected to a source of pressurized fluid, such as air or another gas, and a first end of a fourth tube or other fluid conduit is connected to an air outlet port of the dampener, a fluid is pumped through the first tube and enters the dampener through the fluid input port and passes across a membrane in the dampener, with the membrane deflected into a dampening chamber in the dampener by the pressure of the fluid and, in response to pressure from the pressurized gas in the dampener, deflected back out of the dampening chamber and thereby dampening pulses in the fluid as the fluid passes through the dampener. As noted above, the dampener includes a variable-restrictive-element chamber and an air buffer chamber so that, as the fluid passes across a membrane over the VRE chamber, the membrane deflects into the VRE chamber and occludes, wholly or partially, the channel between the VRE chamber and the air buffer chamber, which in turn is connected to the dampening chamber and thus exerts a force on the membrane towards the fluid channel and away from the dampening chamber.

Pulse dampeners in accordance with the present disclosure can be used in a wide variety of applications. For example, the pulse dampeners of the present disclosure can be used in analytical instruments and biotech systems (e.g., liquid or gas chromatography, ion chromatography, mass spectrometry, micro-chromatography, biochemical detection, biological sensing, drug discovery, drug delivery, molecular separation, proteomics, opto-fluidics, and the like), in in-vitro diagnostic (IVD) systems (e.g., flow cytometry, and clinical chemistry analyzers, including systems that do testing or analysis of blood, urine, DNA or the like, for medical and healthcare applications), and in systems used in industrial applications, such as those in which food products, potable liquids (e.g., milk, water, soft drinks, alcoholic beverages, orange juice, lemonade, and other drinks), air, other liquids, or other fluids are pumped and/or tested. Those skilled in the art will appreciate that pulse dampeners of the present disclosure may be used in still other applications.

Those skilled in the art will also appreciate that different applications often use different types of pumping mechanisms, and the pulse dampener shown and disclosed herein can be used with different types of pumping mechanisms. For example, conventional peristaltic and piston pumps often are used in systems to pump a fluid through the system. Such conventional peristaltic and piston pumps can generate unwanted fluctuations in the pressure of the fluid as it flows from the pump, which in turn may lead to turbulent fluid flow instead of laminar fluid flow. Accordingly, pulse dampeners of the present disclosure can be successfully used in connection with pumps which may generate pressure fluctuations, including peristaltic and piston pumps, as well as gear pumps, syringe pumps, membrane pumps, pressure-driven pumps, and electrosmotic pumps.

Those skilled in the art will appreciate that pulse dampeners like those shown and described above can vary as to size, shape, and dimensions, and can vary as to the materials used for the various components and features as may be desired for a given application. For example, the dampening chamber may be circular, elliptical, or generally shaped like an eye as shown in FIGS. 6A-6C, respectively. In addition, any or all of these shapes may be used with a hemispherical shape of the dampening chamber as shown in FIG. 4 or a cylindrical shape as shown in FIGS. 1-3. In addition, those skilled in the art will appreciate that the pulse dampeners shown can be easily adapted for orientations different than those shown and described above for a given application if desired. Thus, references herein to terms such as "top," "bottom, "right," "left," "above," "below," and the like are merely used for convenience with respect to the illustrations in the figures and are not limiting of the scope of the invention.

Those skilled in the art will further appreciate that the pulse dampener of the present disclosure has a number of advantages. The pulse dampeners of the present disclosure do not require complex mechanical or electrical systems as part of a feedback or control mechanism for dampening pulses. Thus, the pulse dampeners of the present disclosure can be manufactured more easily and more cheaply.

In addition, the pulse dampener of the present disclosure does not introduce a relatively large internal volume into the system, but still provides excellent dampening characteristics across a wide range of pressures and flow rates. These advantages and still others will be apparent to those skilled in the art in view of the embodiments shown and described in this disclosure.

The foregoing detailed descriptions and disclosure are only illustrative and by way of examples. Those skilled in the art will appreciate that the foregoing embodiments can be changed and arranged in different ways, and can be implemented in a variety of ways, all without going beyond the scope and spirit of the invention which is set forth in the claims below. In addition, while the foregoing disclosure has used a particular type of pulse dampener as an example, those skilled in the art will appreciate that the systems and methods described herein will find useful application in a variety of fields in which the present disclosure may be useful. Thus, it will be appreciated that the foregoing descriptions and the figures are illustrative only, and not limiting.

We claim:

1. A method of dampening a pulse, comprising the steps of:
   providing a pulse dampener having a body having an elongated channel extending therethrough and having a first inlet port at a first end of the channel and a first outlet port at a second end of the channel, wherein the first inlet port is adapted for connecting to a source of fluid, and wherein the channel has a first opening to a first chamber and wherein the channel has a second opening to a second chamber, and wherein a pneumatic cover has a buffer chamber, wherein the buffer chamber is in fluid communication with the first chamber and the second chamber, and wherein the buffer chamber is in fluid communication with a second inlet port adapted for connection to a source of pressurized gas, having a second outlet port in fluid communication with the second chamber, and also having at least one elastic membrane element adjacent to a portion of the fluid channel, wherein the at least one elastic membrane element covers the first and second openings;
   connecting the first inlet port of the pulse dampener to a fluid source;
   connecting the first outlet port of the pulse dampener to a first end of a first tube;
   connecting a first end of a second tube to the second inlet port of the pulse dampener;
   pumping a fluid under pressure into the first inlet port; and
   providing pressurized gas to the second inlet port of the pulse dampener through the second tube, thereby dampening pressure variations in the fluid by movement of the at least one membrane element of the pulse dampener in response to the pressure variations in the fluid.

2. The method according to claim 1 wherein the pressurized gas comprises pressurized air with a pressure of from 0 psi to 100 psi.

3. The method according to claim 1 wherein the fluid pressure is in the range from 0 psi to 100 psi.

4. The method according to claim 1 wherein the fluid comprises a liquid.

5. The method according to claim 1 wherein the fluid pressure is in the range from 100 psi to 10,000 psi.

6. The method according to claim 1 wherein a fluid flow rate through the pulse dampener is in the range from 0 to 1000 microliters per minute.

7. The method according to claim 1 wherein a pulse size of the fluid is in the range from 0 and 50 microliters.

8. The method according to claim 1 wherein the fluid comprises a liquid and at least one gas.

9. The method according to claim 1 wherein the fluid comprises a gas.

10. The method according to claim 1 wherein a membrane stop is located within the first chamber.

11. The method according to claim 1 wherein the body and the pneumatic cover comprise one or more of plastics, metals, and ceramics.

12. The method according to claim 1 further comprising the step of manufacturing at least a portion of the body and the pneumatic cover with additive manufacturing techniques.

13. The method according to claim 1 wherein the body and pneumatic cover comprise one unitary piece.

14. The method according to claim 1 wherein the body and pneumatic cover comprise separate pieces.

15. The method according to claim 1 wherein the elastic membrane is comprised of a first elastic membrane located over the first chamber and a second elastic membrane located over the second chamber which is stiffer than the first elastic membrane.

16. The method according to claim 1 wherein the at least one or more elastic membranes are stretched through the use of concentric rings by providing two pairs of ring protrusions on the body of the pulse dampener and two pairs of raised rings on the pneumatic cover wherein the ring protrusions on the body are larger in diameter but concentric with the raised rings such that when the body and pneumatic cover are tightly fitted together, the raised rings fit around the ring protrusions, forming a seal around the first chamber and the second chamber.

17. The method according to claim 1 wherein the first chamber may comprise a circular, elliptical, or eye shape.

18. The method according to claim 1 wherein the first chamber may comprise a hemispherical or a cylindrical portion.

* * * * *